3,134,639
TREATMENT OF ALKALI METAL SULFATES
Alfred F. Nylander, Carlsbad, N. Mex., assignor to International Minerals & Chemical Corporation, a corporation of New York
No Drawing. Filed Jan. 16, 1961, Ser. No. 82,714
4 Claims. (Cl. 23—63)

The present invention generally relates to the treatment of alkali metal sulfates. It more particularly relates to the treatment of alkali metal sulfates with a calcium compound and hydrogen sulfide to produce useful alkali metal compounds. In a specific aspect the present invention relates to the preparation of a carbonate of sodium from sodium sulfate. In another specific aspect the present invention relates to the preparation of a carbonate of potassium from potassium sulfate.

Sodium sulfate is a relatively inexpensive chemical of commerce. It is used mainly in the production of sulfate pulp and glass. Sodium sulfate may be converted into sodium carbonate by the Le Blanc process. However, the Le Blanc process is generally uneconomical and processes for the production of sodium carbonate, as well as other sodium compounds, from sodium sulfate are, therefore, still being investigated. Sodium carbonate finds use in the manufacture of soap and glass.

Potassium sulfate is also a relatively inexpensive chemical of commerce and the agricultural grade is extensively used as a fertilizer. Potassium carbonate, which is used in the manufacture of glass and as a basis for the preparation of other commercial potassium salts which are widely used in the industry, is considerably more expensive than the sulfate and methods for producing the carbonate from the sulfate are constantly being investigated.

Accordingly, it is an object of the present invention to provide a process for treating an alkali metal sulfate.

It is a further object of the present invention to provide a process for producing a carbonate of an alkali metal from the alkali metal sulfate.

It is a specific object of the invention to provide a process for producing sodium carbonate from sodium sulfate.

It is another specific object of the invention to provide a process for producing potassium carbonate from potassium sulfate.

These and other objects and advantages of the present invention will be apparent from the description of the invention.

Generally described, the present invention is a process for treating an alkali metal sulfate which comprises reacting an alkali metal sulfate, a calcium compound and hydrogen sulfide in aqueous solution thereby forming solid calcium sulfate and an aqueous solution containing a water soluble alkali metal compound, separating the resultant solid phase from the resultant liquid phase and recovering alkali metal values from said liquid phase.

In a specific embodiment the present invention embraces a process for producing an alkali metal carbonate from an alkali metal sulfate which comprises reacting an alkali metal sulfate, lime and hydrogen sulfide in aqueous solution thereby forming solid calcium sulfate and an aqueous solution containing a water soluble alkali metal compound, separating the resultant solid phase from the resultant liquid phase, and carbonating said liquid phase to form a carbonate of said alkali metal.

In a more specific embodiment the present invention embraces a process for producing a carbonate of potassium from potassium sulfate which comprises reacting potassium sulfate, lime and hydrogen sulfide in aqueous solution thereby forming solid calcium sulfate and an aqueous solution containing a water soluble potassium sulfide and water soluble calcium sulfide separating the resultant solid phase from the resultant liquid phase, carbonating said liquid phase to form a solution of a water soluble carbonate of potassium and solid calcium carbonate, separating the solid phase from the liquid phase, and recovering a water soluble carbonate of potassium from said liquid phase.

In accordance with the present invention an alkali metal sulfate, a calcium compound and hydrogen sulfide are reacted in aqueous solution to form solid calcium sulfate and an aqueous solution containing a water soluble alkali metal compound. Any suitable alkali metal sulfate may be used in the process of the invention. Sodium sulfate and potassium sulfate are specifically preferred since these materials are relatively inexpensive, readily available and have produced the desired results. The sulfates may be substantially pure material, however, a high purity product may be produced from a relatively impure sulfate; for example, a high purity potassium carbonate may be prepared from agricultural grade potassium sulfate. Any suitable concentration of the alkali metal sulfate in the aqueous solution may be used. Concentrated solutions are, in general, treated more efficiently since less liquid phase results as compared to when dilute solutions are used, and there is less resultant liquid phase to separate from the resultant solid phase.

In order to more readily present the invention, the following description is predominantly directed to the treatment of potassium sulfate and the preparation of potassium compounds therefrom; however, it is to be understood that the process of the invention is applicable to the treatment of other alkali metals and especially the treatment of sodium sulfate and the preparation of sodium compounds therefrom.

The reaction of potassium sulfate with lime and hydrogen sulfide in aqueous solution may be represented by the following equation:

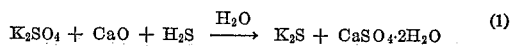

$$K_2SO_4 + CaO + H_2S \xrightarrow{H_2O} K_2S + CaSO_4 \cdot 2H_2O \qquad (1)$$

When an aqueous solution of lime, CaO, is treated with $H_2S$, CaS and/or CaHS form in solution. Therefore, the reaction of the alkali metal sulfate would be with the calcium sulfide compound or compounds. When the lime is first treated with $H_2S$ and the alkali metal sulfate is subsequently added the reaction would then occur as indicated above. Accordingly the calcium compound used in the process of the present invention is selected from the group consisting of lime, sulfides of calcium and mixtures thereof.

The amount of lime, CaO, used in the process of this invention is preferably at least the stoichiometric amount, that is the $CaO/K_2SO_4$ mole ratio is preferably at least 1.0. Larger amounts of lime may, of course, be used. It is desirable to not have an excess of lime of more than 50% and it is more preferable not to have an excess of more than 30%. A 10% lime excess improves the conversion. A preferable broad range of $CaO/K_2SO_4$ mole ratio is therefore, from about 1.0 to about 1.5 and more preferably from about 1.1 to about 1.3.

At least the stoichiometric amount of hydrogen sulfide is preferably used and more preferably an excess amount is used to shift the equilibrium to the formation of $K_2S$. An excess is preferably used since some $K_2S$ reacts with the $H_2S$ to form KHS and some CaS and/or $Ca(HS)_2$ may also be formed. Excess $H_2S$ is not particularly objectionable since any excess is readily driven out of the solution. An amount of hydrogen sulfide in excess of that producing optimum results is generally economically impractical. In general, concentration in the $H_2S$ stage may be carried to the limit of solubility of $K_2S$ or KHS.

The reaction is conducted at any suitable temperature. The reaction goes at ambient temperature although higher or lower temperatures may be used when desired, with a faster reaction rate usually existing at higher temperatures. A liquid water phase is preferred for the reaction and, therefore, temperatures of from about 0° C. to 100° C. may be used although higher temperatures may be utilized provided the system is under superatmospheric pressure so as to maintain a liquid water phase. A preferred temperature range is from about 20° C. to about 85° C. Excellent conversions have been achieved with temperatures of 75° C., however, the resultant slurry is difficult to filter and lower temperatures are, therefore, more particularly preferred.

As presented above in the Equation 1, a main reaction of potassium sulfate, lime and hydrogen sulfide is to produce calcium sulfate in the hydrated form as solid gypsum, $CaSO_4 \cdot 2H_2O$. The potassium values are converted into the sulfide form as $K_2S$ and/or $KHS$, which are both relatively soluble materials. The potassium values are, therefore, in the liquid phase and may readily be separated from the solid phase, which solid phase is gypsum and other solid impurities which may be present. The separation of the liquid phase from the solid phase may be effected in any suitable manner such as filtration, centrifugal separation, etc.

The liquid phase containing the potassium values may be treated in any suitable manner to recover the potassium values. As hereinbefore set forth, the liquid phase is an aqueous solution containing $K_2S$, $KHS$, and $Ca(HS)_2$. In a specific embodiment after the removal of the gypsum and any solid impurities, the aqueous solution is carbonated, that is treated with $CO_2$, to convert the potassium compound or compounds into a carbonate of potassium. During the carbonation of the aqueous solution, the carbon dioxide reacts with the $K_2S$ and the $KHS$ to form potassium carbonate. The reaction may be represented as follows:

$$2KHS + CO_2 + H_2O \rightarrow K_2CO_3 + H_2S \quad (2)$$

$$K_2S + CO_2 + H_2O \rightarrow K_2CO_3 + H_2S \quad (3)$$

The hydrogen sulfide released is preferably recycled into contact with potassium sulfate.

During the carbonation potassium bicarbonate, $KHCO_3$, also formed by the reaction:

$$K_2CO_3 + H_2O + CO_2 \rightarrow 2KHCO_3 \quad (4)$$

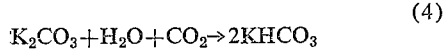

and during the latter stages of a relatively long carbonation period large amounts of the bicarbonate may be present in the solution.

The aqueous solution that is carbonated also contains $Ca(HS)_2$ which reacts with the carbon dioxide during carbonation to form a solid calcium carbonate precipitate, $CaCO_3$, and hydrogen sulfide by the reaction:

$$Ca(HS)_2 + CO_2 + H_2O \rightarrow CaCO_3 + 2H_2S \quad (5)$$

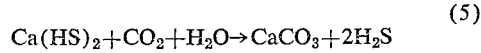

The calcium carbonate precipitate may, of course, be readily separated from the potassium carbonate solution by any suitable means such as filtration, centrifugal separation, etc.

The aqueous solution is carbonated with any suitable carbon dioxide-containing material; preferably with a carbon dioxide-containing gas. The gas, or other material, however, of course, preferably does not contain other constituents which would react with the solution to form undesirable compounds. Substantially pure carbon dioxide may be used as well as flue gases, mixtures of carbon dioxide with air, nitrogen, carbon monoxide, etc. The gas utilized preferably contains at least 2% by volume of carbon dioxide. In general, concentration in the $CO_2$ stage may be carried to the limit of solubility of $KHCO_3$.

The reaction between the aqueous solution of potassium sulfide with the carbon dioxide takes place at operating conditions that may be employed in the prior art processes of this general type. Ambient temperatures may be used although higher or lower temperatures may be used when desired. The temperature is, however, below that at which decomposition of the reactants and/or products takes place. A liquid water phase is preferred for the reaction and, therefore, temperatures of from about 0° C. to about 100° C. may be used although higher temperatures may be utilized provided superatmospheric pressure is used to maintain a liquid water phase. A preferred temperature range is from about 20° C. to about 85° C. However, at temperatures of about 75° C., it is difficult to remove the last traces of sulfide ion, probably due to the much lower solubility of $CO_2$ at these higher temperatures. Temperatures below 75° C. are, therefore, more particularly preferred. Atmospheric pressues may be employed as well as subatmospheic and superatmospheric pressures. Superatmospheric pressures are preferred since, in general, the reaction proceeds at a faster rate at higher pressures.

When the $H_2S$ reaction and the $CO_2$ reaction are carried out at about 70° C., a solution saturated in $KHCO_3$ at about 60° C., containing nearly 500 grams per liter equivalent $KHCO_3$, is obtained. This solution, when cooled to 28° C., forms crystals containing 7.5% $K_2CO_3$ and 86.80% $KHCO_3$, the remainder being water and trace impurities. Evaporation of any liquors containing 400 grams per liter $KHCO_3$ equivalent or higher to dryness and heating to form $K_2CO_3$, form a product of about 99.0% purity. Even higher purity may be obtained by split crystallization evaporation.

As hereinbefore set forth, while the above description of the invention is predominantly directed to the treatment of potassium sulfate and the preparation of potassium compounds, it is to be understood that the process of the invention is applicable to the treatment of other alkali metals and especially the treatment of sodium sulfate and the preparation of sodium compounds therefrom.

In order to give a fuller understanding of the invention, but with no intention to be limited thereto, the following specific examples are given.

EXAMPLE I 72 grams of refined $K_2SO_4$ was added to 507 grams of $H_2O$ and 26 grams of 91% CaO lime (stoichiometric amount) was then added. $H_2S$ was then passed into the solution at the rate of 1.39 liters/minute for 30 minutes. $H_2S$ addition was then discontinued and pH measurement and temperature measurements were continued for a 14 minute holding time. The results are given below in Table 1.

Table 1

| Time, minutes | Temperature, °C. | pH |
|---|---|---|
| 0 | 30 | 12.2. |
| 4 | 35 | 11.4. |
| 13 | 42 | 10.7. |
| 20 | 43 | 7.6. |
| 30 | 38 | 7.8 end $H_2S$. |
| 33 | 36 | 8.5. |
| 37 | 35 | 9.3. |
| 41 | 33 | 10.3. |
| 44 | 32 | 10.4. |

The resultant slurry was filtered and the cake was washed with 50 ml. of water, the wash water discarded, and the washed cake and filtrate were sampled and analyzed. The results are given below in Table 2.

Table 2

| | Weight percent | | | |
|---|---|---|---|---|
| | K | Ca | $SO_4$ | S |
| Cake | 2.47 | 11.55 | 31.11 | 0.04 |
| Filtrate | 5.56 | 0.46 | 0.25 | 0.97 |

The filtrate was carbonated with bottle gas $CO_2$ at a $CO_2$ rate of 7.85 liters/minute for 33 minutes. Temperature and pH were measured during the carbonation. The results are given below in Table 3.

*Table 3*

| Time, minutes | Temperature, °C. | pH |
|---|---|---|
| 0 | 22 | 11.1. |
| 4 | 22 | 8.7. |
| 13 | 23 | 8.3. |
| 23 | 23.5 | 7.5. |
| 33 | 22 | 7.5 end carbonation. |

A white slurry was produced by the carbonation. The slurry which contained 2.5% by weight solids was filtered and the cake and filtrate were sampled and analyzed. The analysis is given below in Table 4.

*Table 4*

| | Weight percent | | | |
|---|---|---|---|---|
| | K | Ca | $SO_4$ | $CO_2$ |
| Cake | 3.00 | 19.71 | 0.16 | 28.10 |
| Filtrate | 5.53 | Trace | 0.28 | 6.47 |

The filtrate was titrated with 0.842 N HCl to phenolphthalein and bromothymol purple end points for respective $K_2CO_3$ and $KHCO_3$ contents. The titration showed the filtrate to be 0.101 N $K_2CO_3$ and 1.364 N $KHCO_3$. The total equivalent of $KHCO_3$ was 146.6 grams per liter. The make up of the original solution of $K_2SO_4$ and water would given a theoretical final concentration of 165.4 grams per liter equivalent $KHCO_3$. The overall conversion of $K_2SO_4$ to $KHCO_3$, was, therefore, $$100 \times \frac{146.6}{165.4} = 88.6\%$$

EXAMPLE II 113 grams of refined $K_2SO_4$ was added to 500 grams of $H_2O$ and 44 grams of 91% CaO lime (10% excess) was then added. This mixture represents a theoretical final concentration of 260 grams per liter of $KHCO_3$. $H_2S$ was then passed into the solution at the rate of 1.39 liters/minute for 40 minutes. $H_2S$ addition was then discontinued and pH measurements and temperature measurements continued for a 39 minute holding period. The results are given below in Table 5.

*Table 5*

| Time, minutes | Temperature, °C. | pH |
|---|---|---|
| 0 | 28 | 13. |
| 6 | 37 | 11.9. |
| 14 | 49 | 10.6. |
| 22 | 53.5 | 10.35. |
| 26 | 53.5 | 10.4. |
| 34 | 49 | 7.9. |
| 40 | 44 | 7.84 end $H_2S$. |
| 43 | 43 | 8.0. |
| 49 | 40 | 8.6. |
| 68 | 38 | 9.7. |
| 79 | 36 | 10.44. |

The resultant slurry was filtered, the filter cake washed with 50 ml. of water, the wash water discarded, and the washed cake (173 grams) and filtrate (499 grams) were sampled and analyzed. The results are given below in Table 6.

*Table 6*

| | Weight percent | | | |
|---|---|---|---|---|
| | K | Ca | $SO_4$ | S |
| Cake | 5.31 | 12.38 | 35.80 | 0.33 |
| Filtrate | 7.39 | 1.07 | 0.25 | 6.99 |

The filtrate was carbonated with bottle gas $CO_2$ at a $CO_2$ rate of 7.85 liters/minute for 40 minutes. Temperature and pH measurements taken during the carbonation are given below in Table 7.

*Table 7*

| Time, minutes | Temperature, °C. | pH |
|---|---|---|
| 0 | 26 | 10.4 |
| 6 | 29 | 8.3 |
| 10 | 30.5 | 8.1 |
| 19 | 31 | 7.7 |
| 27 | 29.9 | 7.63 |
| 40 | 28 | 7.56 |

The carbonation produced a slurry which was filtered, giving 24 grams of filter cake and 398 grams of filtrate. An analysis of the filter cake and filtrate are given below in Table 8.

*Table 8*

| | Weight percent | | | |
|---|---|---|---|---|
| | K | Ca | $SO_4$ | $CO_2$ |
| Cake | 4.08 | 19.31 | 0.16 | 26.59 |
| Filtrate | 7.64 | Trace | 0.18 | 6.27 |

Analysis of the filtrate by titration as described above in Example I indicated an overall conversion of $K_2SO_4$ to $KHCO_3$ of 82.3%.

EXAMPLE III 88 grams of 91% CaO lime (30% excess) was added to 518 grams of $H_2O$ neutralized to CaS by the addition of $H_2S$ for 18 minutes, and 184 grams of agricultural grade $K_2SO_4$ (95% $K_2SO_4$) was then added. This mixture represents a theoretical final concentration of 400 grams per liter of $KHCO_3$. $H_2S$ was then continued into the solution at the rate of 3.66 liters/minute for a total of 49 minutes. $H_2S$ addition was then discontinued and pH and temperature measurements continued for a 45 minute holding period. The results are given below in Table 9.

*Table 9*

| Time, minutes | Temperature, °C. | pH |
|---|---|---|
| 0 | 28 | 13. |
| 1 | 40 | 8.9. |
| 12 | 74 | 9.7. |
| 18 | 76 | 9.7 end $K_2SO_4$. |
| 32 | 56 | 9.2. |
| 41 | 47 | 8.95. |
| 49 | 42 | 9.0 end $H_2S$. |
| 58 | 40 | 9.05. |
| 82 | 38 | 10.0. |
| 94 | 38 | 10.37. |

The resultant slurry was filtered, the filter cake washed with 50 ml. of water (the wash water discarded) to produce 303 grams of filter cake and 445 grams of filtrate. The filtrate was carbonated with bottle gas $CO_2$ at a $CO_2$ rate of 8.7 liters/minute for 42 minutes. Temperature and pH measurements taken during the carbonation are given below in Table 10.

Table 10

| Time, minutes | Temperature, °C. | pH |
|---|---|---|
| 0 | 33 | 10.1 |
| 9 | 32 | 10.15 |
| 15 | 34 | 10.0 |
| 24 | 34 | 9.88 |
| 30 | 32 | 9.9 |
| 42 | 27 | 9.86 |

The carbonation produced a slurry which was filtered, giving 50 grams of filter cake and 249 grams of filtrate.

Analysis of the filtrate by titration as described above in Example I showed a $KHCO_3$ concentration of 382.7 grams per liter or an overall conversion of $$\frac{382.7}{400} \times 100 = 95.7\%$$

EXAMPLE IV 92 grams of 91% CaO lime (20% excess) was added to 518 grams of water, and $H_2S$ addition started at the rate of 1.39 liters/minute. After $H_2S$ addition for 4 minutes 56.38 grams of reagent grade $Na_2SO_4$ was added. After an additional 13 minutes of $H_2S$ addition another 56.33 gram portion of $Na_2SO_4$ was added and after an additional 9 minutes of $H_2S$ addition a final 56.33 gram portion of $Na_2SO_4$ was added. This mixture represents a theoretical final concentration of 400 grams per liter of $NaHCO_3$. $H_2S$ addition was continued for an additional 18 minutes, the total time period for adding $H_2S$ being 44 minutes. $H_2S$ addition was then discontinued and pH and temperature measurements continued for a 23 minute holding period. The results are given below in Table 11.

Table 11

| Time, minutes | Temperature, °C. | pH |
|---|---|---|
| 0 | 35 | 9.8 add CaO. |
| 4 | 69 | 9.8 add ⅓ $Na_2SO_4$. |
| 17 | 72 | 9.5 add ⅓ $Na_2SO_4$. |
| 26 | 77 | 8.75 add ⅓ $Na_2SO_4$. |
| 32 | 70 | 8.42. |
| 41 | 61 | 8.25. |
| 44 | 56 | 8.20 end $H_2S$. |
| 53 | 50 | 8.28. |
| 62 | 45 | 8.81. |
| 67 | 44 | 9.12. |

The resultant slurry was filtered, the filter cake washed with 50 ml. of water, the wash water discarded, and the washed cake (402 grams) and filtrate (398 grams) were sampled and analyzed. The results are given below in Table 12.

Table 12

| | Weight percent | | | |
|---|---|---|---|---|
| | Na | $SO_4$ | Ca | S |
| Cake | 1.74 | 38.43 | 14.19 | 0.26 |
| Filtrate | 7.56 | 0.06 | 2.57 | 17.17 |

The filtrate was carbonated with bottle gas $CO_2$ at a $CO_2$ rate of 7.85 liters/minute for 24 minutes. Temperature and pH measurements taken during the carbonation are given below in Table 13.

Table 13

| Time, minutes | Temperature, °C. | pH |
|---|---|---|
| 0 | 31 | 9.44 |
| 6 | 29.5 | 8.54 |
| 12 | 29 | 8.65 |
| 20 | 29.5 | 8.74 |
| 24 | 30 | 8.82 |

The carbonation produced a slurry of $NaHCO_3$ crystals. The slurry was filtered giving 38 grams of filter cake and 203 grams of filtrate. Analysis of the filter cake and filtrate are given below in Table 14.

Table 14

| | Weight percent | | | |
|---|---|---|---|---|
| | Na | $SO_4$ | Ca | S |
| Cake | 1.23 | 0.10 | 20.30 | 25.80 |
| Filtrate | 8.76 | 0.08 | Trace | 8.73 |

Analysis of the filtrate by titration as described in Example I shows 382 grams/liter equivalent $NaHCO_3$ which represents an overall conversion of 95.5%.

The above examples illustrate the production of alkali metal carbonates from the respective alkali metal sulfates. The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:
1. A process for the production of an alkali metal carbonate from the corresponding alkali metal sulfate which comprises
   (A) reacting lime in aqueous solution with hydrogen sulfide to form therein a water soluble calcium sulfide;
   (B) adding to the resulting solution an alkali metal sulfate and additional hydrogen sulfide thereby forming therein a precipitate of calcium sulfate and an aqueous phase containing an alkali metal sulfide;
   (C) separating said calcium sulfate precipitate from said aqueous phase;
   (D) carbonating said aqueous phase to form a solution of a water-soluble alkali metal carbonate and solid calcium carbonate;
   (E) separating the solid calcium carbonate from the solution; and
   (F) recovering from said solution an alkali metal carbonate.
2. A process according to claim 1 wherein the lime/alkali metal sulfate mole ratio is within the range of from about 1.0 to about 1.5
3. A process according to claim 1 wherein the alkali metal sulfate is potassium sulfate.
4. A process according to claim 1 wherein the alkali metal is sodium sulfate.

References Cited in the file of this patent

UNITED STATES PATENTS

| 1,722,170 | Bassett | July 23, 1929 |
| 1,728,252 | Rawling | Sept. 17, 1929 |
| 1,765,737 | Pierce | June 24, 1930 |
| 1,979,151 | Fricke | Oct. 30, 1934 |
| 2,106,952 | Konig | Feb. 1, 1938 |
| 2,838,374 | Beyer | June 10, 1958 |

FOREIGN PATENTS

| 184,795 | Great Britain | Nov. 23, 1922 |

OTHER REFERENCES

Mellor: "Comprehensive Treatise on Inorganic and Theoretical Chemistry," vol. 2, 1922, page 721.

UNITED STATES PATENT OFFICE
CERTIFICATE OF CORRECTION

Patent No. 3,134,639                                    May 26, 1964

Alfred F. Nylander

It is hereby certified that error appears in the above numbered patent requiring correction and that the said Letters Patent should read as corrected below.

Column 4, line 15, for "pressues" read -- pressures --; line 16, for "subatmospheic" read -- subatmospheric --; column 6, Table 8, under the heading "$CO_2$", line 1 thereof, for for "26.59" read -- 26.95 --; column 8, Table 14, last heading, for "S" read -- $CO_2$ --; column 8, line 59, after "metal" insert -- sulfate --.

Signed and sealed this 24th day of November 1964.

(SEAL)
Attest:

ERNEST W. SWIDER                                  EDWARD J. BRENNER
Attesting Officer                                       Commissioner of Patents